United States Patent Office 3,467,223
Patented Sept. 16, 1969

3,467,223
CONVEYOR SYSTEM FOR ELONGATED
STRUCTURES
John Suozzo and Henry C. Savino, Hackensack, N.J.,
assignors to Westinghouse Electric Corporation, Pittsburgh, Pa., a corporation of Pennsylvania
Filed Feb. 11, 1966, Ser. No. 526,813
Int. Cl. B66b 1/36
U.S. Cl. 187—29                                15 Claims

ABSTRACT OF THE DISCLOSURE

A tall building has a lower first feeder or shuttle bank of elevators operating between a bottom terminal or main floor and a transfer floor. The building has a local second bank of elevators operating between the transfer floor and higher floors to provide local service. A computer maintains a proper number of feeder elevators in service, distributes feeder elevator cars between the bottom terminal and transfer floors, and coordinates arrival of local and feeder elevator cars at the transfer floor. If plural feeder banks are employed the computer coordinates the service provided by such feeder banks.

This invention relates to a conveyor system for elongated structures and it has particular relation to such a system wherein vehicles, such as elevators, are divided into one or more feeder banks and one or more local banks which may be located on one side of a feeder bank or banks.

It has been previously proposed that elongated structures, such as tall buildings, be provided with vehicle or elevator service operating in two stages. As applied to a tall building, the first stage includes a feeder or shuttle bank for providing express service between a lower main floor such as a street floor and a transfer floor located at a high level of the building. A second stage includes one or more local banks of elevators for providing elevator service between the transfer floor and higher floors of the building. These banks operate independently of each other. Although some time is lost in the transfer of passengers at the transfer floor, the transfer of passengers between the main floor and the transfer floor can be accomplished by a relatively small number of express high-speed elevators. This results in a very large overall saving in the space required for elevator hoistways.

In accordance with the invention the banks of elevators in a bank are coordinated to provide efficient operation. In a preferred arrangement, traffic information is supplied to computer equipment. This computer equipment assists in controlling the elevator system to:

(1) Maintain in service a proper number of feeder elevator cars to handle the existing traffic;

(2) Distribute the feeder elevator cars between the main floor and the transfer floor for utmost efficiency;

(3) Coordinate arrival of local and feeder elevator cars at the transfer floor; and (4) Coordinate service provided by plural feeder banks if more than one such bank is employed.

It is therefore an object of the invention to provide an improved elevator system for tall buildings.

It is another object of the invention to provide an improved elevator system employing feeder and local banks of elevators wherein such banks are coordinated to operate at improved efficiency.

It is also an object of the invention to provide an improved elevator system employing local and feeder elevator banks having a common transfer floor for coordinating arrival of the elevator cars at the transfer floor to assure improved efficiency.

It is an additional object of the invention to provide an improved elevator system for tall buildings wherein the operation of plural feeder banks of elevators is coordinated for improved efficiency.

Other objects of the invention will be apparent from the following description taken in conjunction with the accompanying drawings in which.

Figure 1:
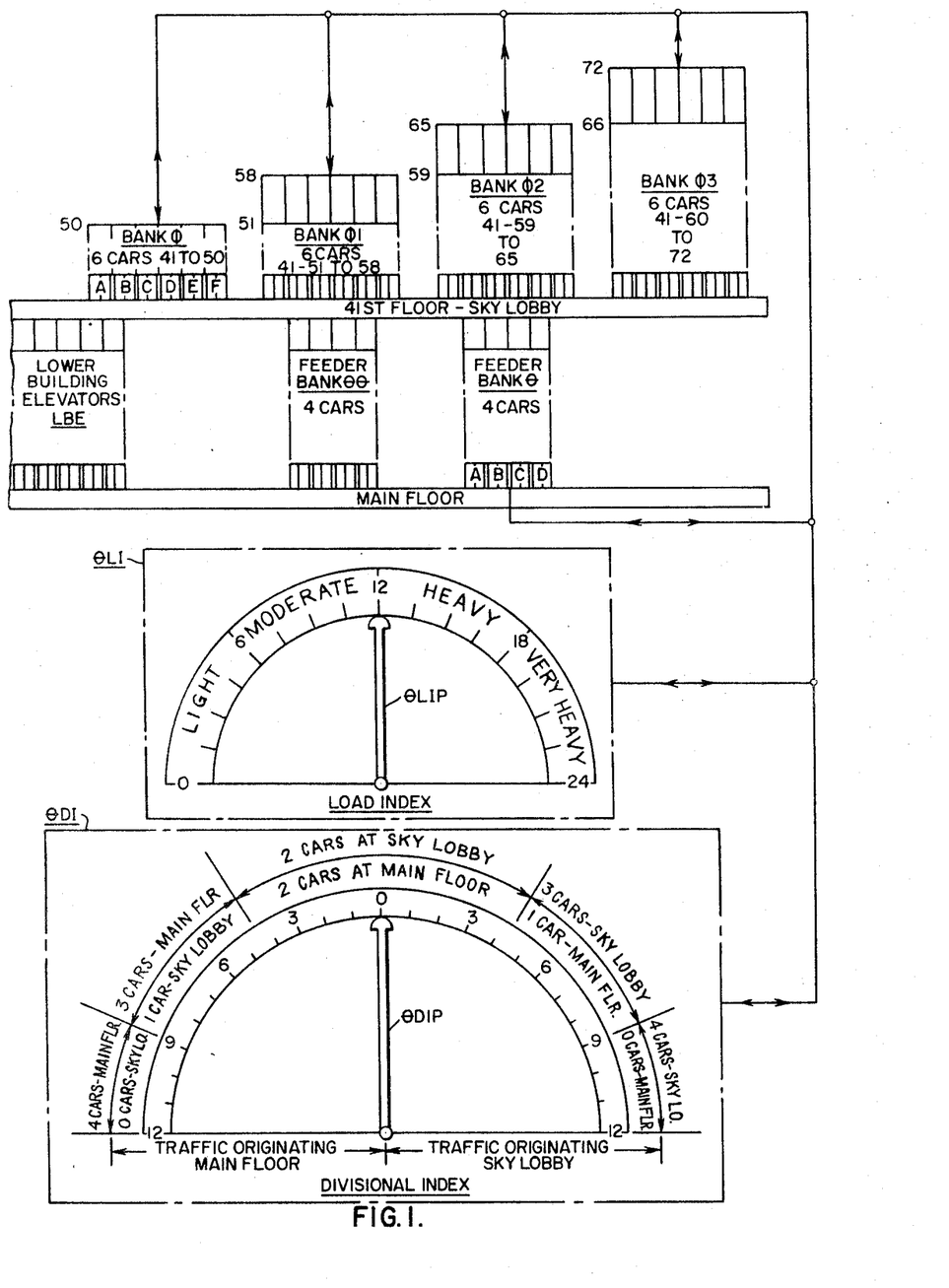
FIG. 1 is a schematic view with parts in block form representing an elevator system embodying the invention.

FIGURE 1

The invention may be applied to buildings having various numbers of floors and various floor arrangements. For illustrative purposes a building having 72 floors is illustrated in FIG. 1. These floors include a main floor which may be located at the street level and a transfer floor which is assumed to be located at the 41st floor. This floor also may be referred to as a "sky lobby." Elevator service for the floors between the main floor and the sky lobby is provided by one or more banks of lower building elevators LBE.

Passengers desirous of travelling between the main floor and a floor located above the 41st floor or sky lobby travel between the main floor and the sky lobby in elevators located in one or more feeder banks. For illustrative purposes two feeder banks $\theta$ and $\theta\theta$ are shown. The number of feeder banks and the number of cars in each of the banks depend on traffic requirements. For present purposes, it will be assumed that each of the feeder banks has four elevator cars A, B, C and D.

For elevator service above the sky lobby, passengers employ elevators located in one or more banks. Again the number of local banks and the number of elevators in each of the local banks depend on traffic requirements. For illustrative purposes it is assumed that four local banks $\phi$, $\phi 1$, $\phi 2$ and $\phi 3$ are employed. Each of the local banks is assumed to have six elevators A, B, C, D, E and F. The bank of elevators $\phi$ is assumed to serve the floors 41 to 50. The bank $\phi 1$ serves the 41st floor and the floors 51 to 58. The elevator cars in this bank are arranged to run express between the 41st and 51st floors. In a similar manner, the elevator cars of the bank $\phi 2$ serve the 41st and 59th to 65th floors. Finally the bank $\phi 3$ provides local elevator service for the 41st floor and the floors 66 to 72.

In order to coordinate the elevators of the elevator system for optimum efficiency, computer equipment is provided which includes a "load index" $\theta LI$ and a divisional index" $\theta DI$. The load index repeatedly samples the sum of the loads of all of the cars in the feed bank $\theta$ that leave both the main floor and the sky lobby. Thus the load index may include a pointer $\theta LIP$ which indicates on an associated scale whether the total loading is light, moderate, heavy or very heavy. This load index determines in part the number of elevators in each of the feeder banks to be kept in service. The load index further indicates when help is desired from another feeder bank. The load index additionally indicates when its feeder bank has one or more elevators available to help another feeder bank.

The division index indicates the difference in traffic originating at the main floor and at the sky lobby. Thus the divisional index may have a pointer $\theta DIP$ which indicates on a scale associated therewith the number of cars allocated to the main floor and to the sky lobby. In FIG. 1, the pointer is in a central position indicating a balanced condition wherein the elevator cars of the bank θ are evenly divided between the main floor and the sky lobby. Positions of the pointer displaced in a clockwise direction from the position indicated in FIG. 1 indicates that more traffic originates at the sky lobby than at the main floor and assigns a preponderance of the elevator cars of the bank θ to the sky lobby. Conversely a position of the pointer displaced in a counterclockwise direction from the position indicated in FIG. 1 indicates that a preponderance of the traffic originates at the main floor and that a preponderance of the elevator cars of the bank θ should be assigned or allocated to the main floor. When the traffic in the feeder bank is predominantly in the up direction the divisional index also may bias the local banks to send cars to the sky lobby.

The computing equipment also senses when traffic in the local banks φ to φ3 predominantly is in the down direction. Under this circumstance, the feeder banks are biased to assign elevator cars to the sky lobby.

If traffic requirements follow a reasonably definite pattern on a time basis in repetitive cycles the computing equipment may take the form of clock mechanism for assigning car allocations and biases on a time basis. However, in a preferred embodiment of the invention, the allocations and biases are responsive directly to the traffic.

A system involving the invention now will be discussed in detail. In order to simplify the presentation of the invention it will be assumed that each of the banks of elevators is similar to the bank disclosed in the Santini and Suozzo Patent 2,740,495 which issued Apr. 3, 1956. The conventions employed in the patent also will be employed here. Thus for the bank φ the first floor of the system shown in the patent would correspond to the sky lobby. For the bank φ1 of FIG. 1, no car call registering buttons or relays and no floor call registering buttons or relays would be required for a floor between the 41st and 51st floors. Similar comments apply for the bank φ2 and φ3 with respect to the floors which are not served by these banks.

The feeder bank θ also is based on the system shown in aforesaid patent. FIGS 2, 3, 4, and 5 reproduce certain components of the aforesaid patent with changes which will be discussed below. Components of FIGS. 2, 3, 4 and 5 which are similar to components of the aforesaid patent are identified by the same reference characters. In some cases which will be mentioned below, contacts are added to the relays which are shown in the patent. For convenience, the following components common to the aforesaid patent and to the present FIGURES 2, 3, 4 and 5 are reproduced as follows:

D—Down switch
E—Inductor slowdown relay
F—Inductor stopping relay
G—Holding relay
LT—Lower-terminal relay
M—Running relay
MG—Motor-generator starting switch
NL—Lower-terminal next relay
NT—Upper-terminal next relay
R—Door-control relay
S—Floor or corridor-call stopping relay
SL—Lower-terminal start relay
ST—Upper-terminal start relay
TT—Upper-terminal relay
U—Up switch
V—Speed relay
W—Up-direction relay
X—Down-direction relay
Z—Door-safety relay
11—Electric Motor
13—Traction sheave
15—Brake
60—Motor-generator set
70T—Non-interference relay

Figure 2:
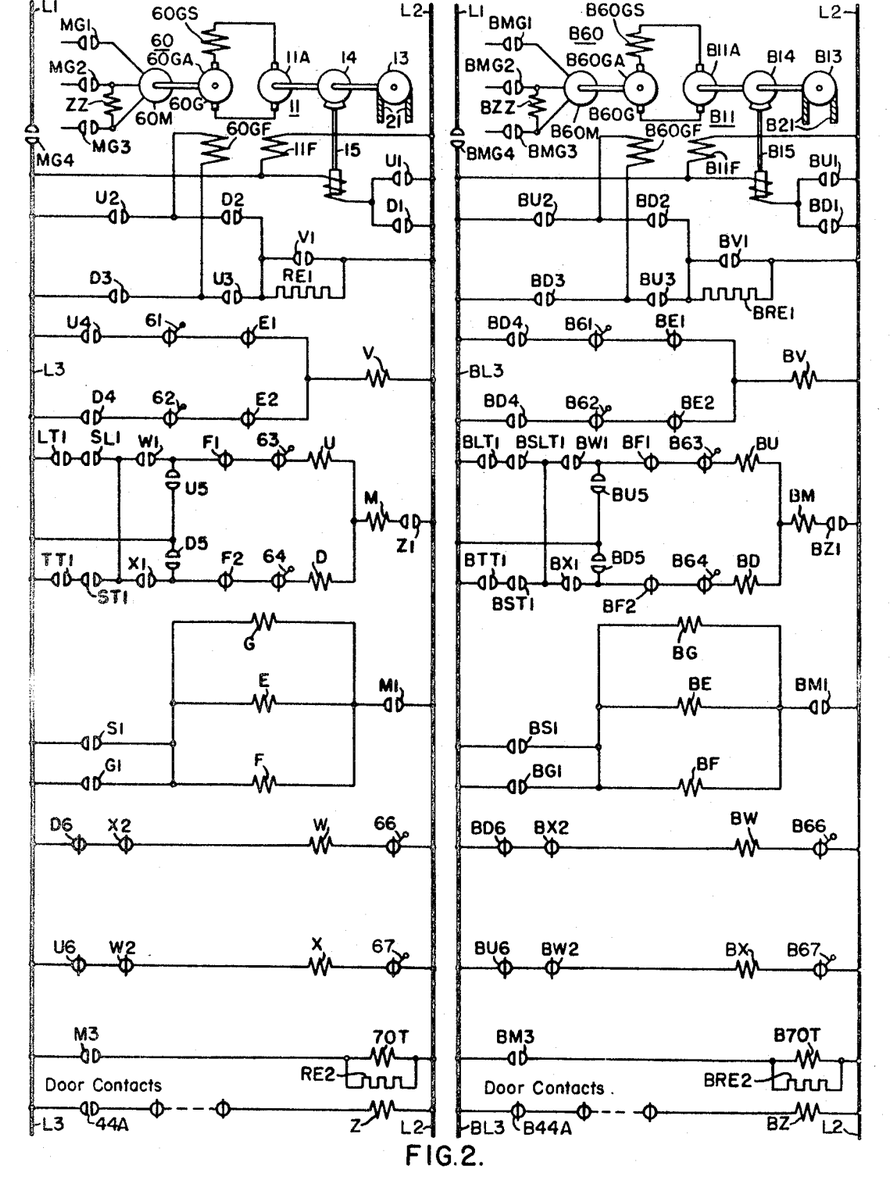
FIGS. 2 to 11 (including FIG. 3A) are diagrammatic representations with circuits shown in straight-line form of an elevator system embodying the invention.

FIGURE 2

FIGURE 2 is similar to FIG. 3 of the aforesaid Santini et al. patent with the following exceptions:

In the patent the up switch U, the down switch D and the running relay M for the elevator A are controlled by three parallel circuits in part. A first one of these circuits, also shown in the present FIG. 2, includes in series make contacts LT1 of the lower-terminal relay (the main floor in the present case) and make contacts SL1 of the lower-terminal start relay. Consequently, when the elevator car A is to start from the main floor the contacts LT1 and SL1 close to energize the up switch U and the running relay M.

The second circuit, also shown in the present FIG. 2, includes in series the make contacts TT1 of the upper-terminal relay and the make contacts ST1 of the upper-terminal start relay. In the present case, the upper terminal is the sky lobby. Consequently, when the elevator car A is to start down from the sky lobby the make contacts TT1 and ST1 close to complete an energizing circuit for the down switch D and the running relay M.

The third circuit employed in the patent was for the purpose of initiating starting of the elevator car A from floors intermediate the two terminals. Inasmuch as the elevator cars of the bank θ run express between the two terminal floors, the third circuit is not here required and has been deleted. Inasmuch as the sky lobby is the upper limit of travel of the elevator car A the limit switch 63 is set to open as the car in travelling up nears the sky lobby. The limit switch 64 is set to open as the car A nears its lower limit of travel, in this case the main floor, at the end of a down trip.

As shown in the Santini et al. patent, the inductor slowdown relay E and the inductor stopping relay F are energized by any one of a number of contacts for the purpose of initiating a slowdown and stopping operation of the elevator car A. In the present case, only the make contacts S1 are required for initiating a slowdown and stopping operation. The other initiating contacts shown in the patent consequently are deleted.

The up direction relay W is energized through a series circuit which includes only the break contacts D6 and X2, and the limit switch 66. The limit switch 66 is set to open as the elevator car A on an up trip nears the sky lobby. The patent shows similar components.

The down direction relay X is energized through a circuit which includes in series only the break contacts U6 and W2, and the limit switch 67. The limit switch 67 is set to open as the elevator car A on a down trip nears the main floor.

Similar changes are made in the circuits of the other elevators of the bank θ and are shown for the elevator B.

Figure 3:
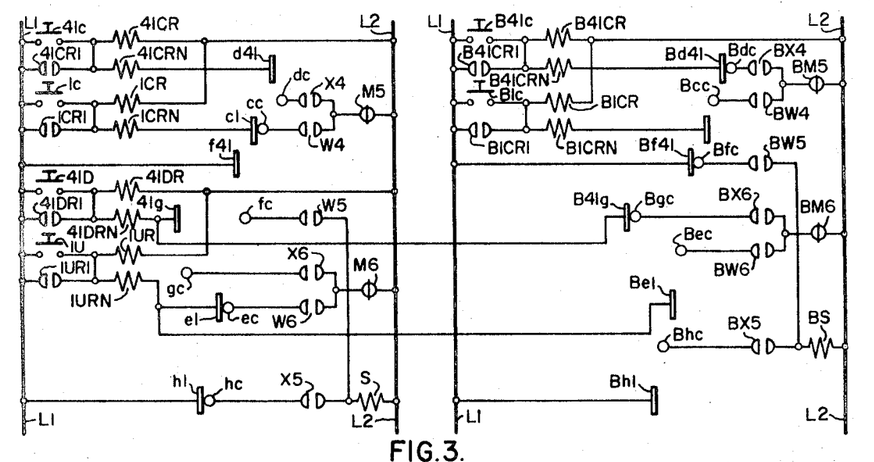

FIGURE 3

The present FIG. 3 is based on FIG. 4 of the aforesaid patent. However, inasmuch as the elevator cars of the feeder bank θ shuttle between the main floor and the sky lobby the circuits have been materially simplified.

During an up trip of the elevator car A the only stop is at the sky lobby. For this reason, the only contact segment required in the f row is the contact segment f41 for the sky lobby floor. This contact segment f41 is connected to the bus L1 and is positioned to be engaged by the brush fc as the elevator car A on an up trip approaches the slowdown distance required for the sky lobby floor. When the floor stopping relay S is energized it initiates a slowdown and stopping operation of the elevator car A at the sky lobby in the same manner discussed in the aforesaid patent.

During a down trip of the elevator car A the only floor at which it stops is the main floor. For this reason, the only contact segment in the h row which is required is the contact segment h1 for the main floor and this is connected to the bus L1. During a down trip of the elevator car A, when the elevator car approaches the slowdown and stopping distance for the main floor the brush *hc* engages the contact segment *h*1 to complete an energizing circuit for the stopping relay S. This initiates a stopping of the elevator car A at the main floor in the same manner discussed in the patent.

A car-call registering relay 41CR and its canceling coil 41CRN are provided for the sky lobby and a car-call registering relay 1CR and its canceling coil 1CRN are provided for the main floor. Each of these relays is picked up when its associated car button is pressed and is dropped out when the elevator car A nears the corresponding floor in the manner described in the aforesaid patent.

In addition, a floor-call registering relay 41DR and its canceling coil 41DRN are provided for registering a down floor call from the sky lobby and a floor-call registering relay 1UR and its canceling coil 1URN are provided for registering an up floor call from the main floor. As shown in FIG. 5 of the above-mentioned patent, the call registering relays are employed in controlling no-call relays 78, B78, etc. In the present case, these relays have added contacts 78–6, B78–6 etc. which will be discussed below in connection with FIG. 8.

If desired, an up floor lantern may be provided for each car at the main floor and a down floor lantern may be provided for each car at the sky lobby. These would correspond respectively to the floor lanterns 1UL and 6DL of FIG. 5 of the Santini et al. patent and would be similarly energized. Other components shown in FIG. 5 of the patent are not required for the feeder bank $\theta$.

Figure 3A:
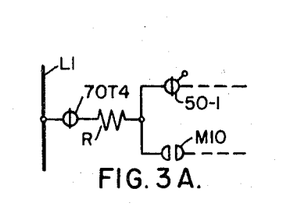

Although the doors may be operated manually, it will be assumed that they are operated as shown in FIG. 6 of the aforesaid Santini et al. patent with one exception. As shown in FIG. 3A break contacts 70T4 operated by the non-interference relay 70T are connected in series with the operating winding of the door-control relay R to prevent closure of the doors of the elevator car A for a substantial time such as 5 seconds after the car stops. The relays QL, Q and DP of the Santini patent are not required for the feeder bank $\theta$.

Figure 4:
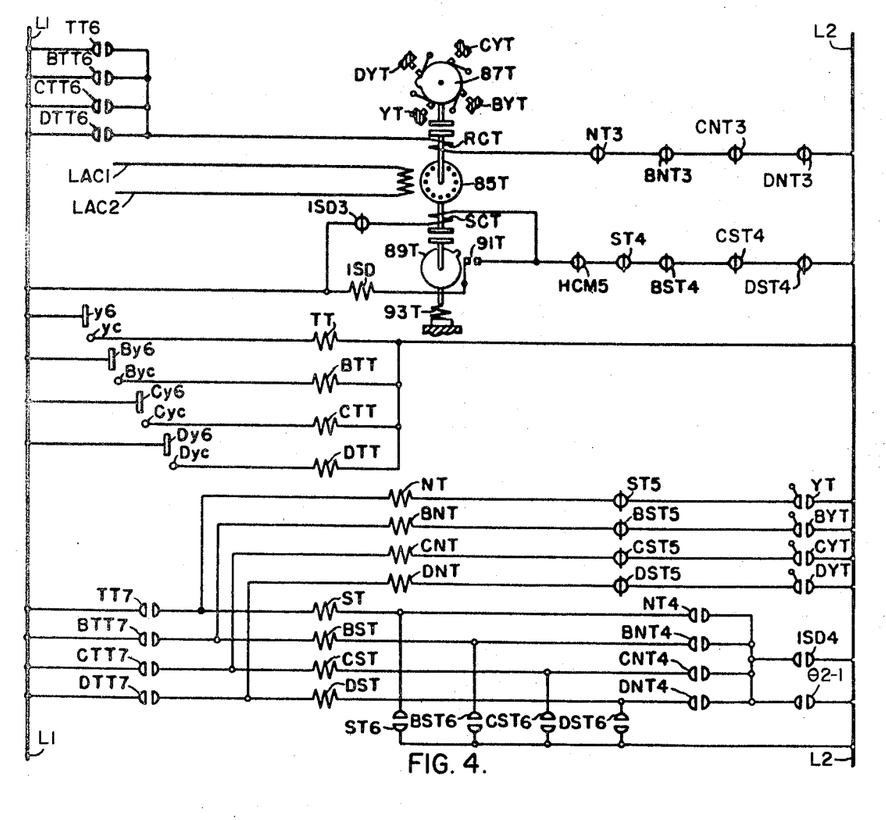
Figure 5:
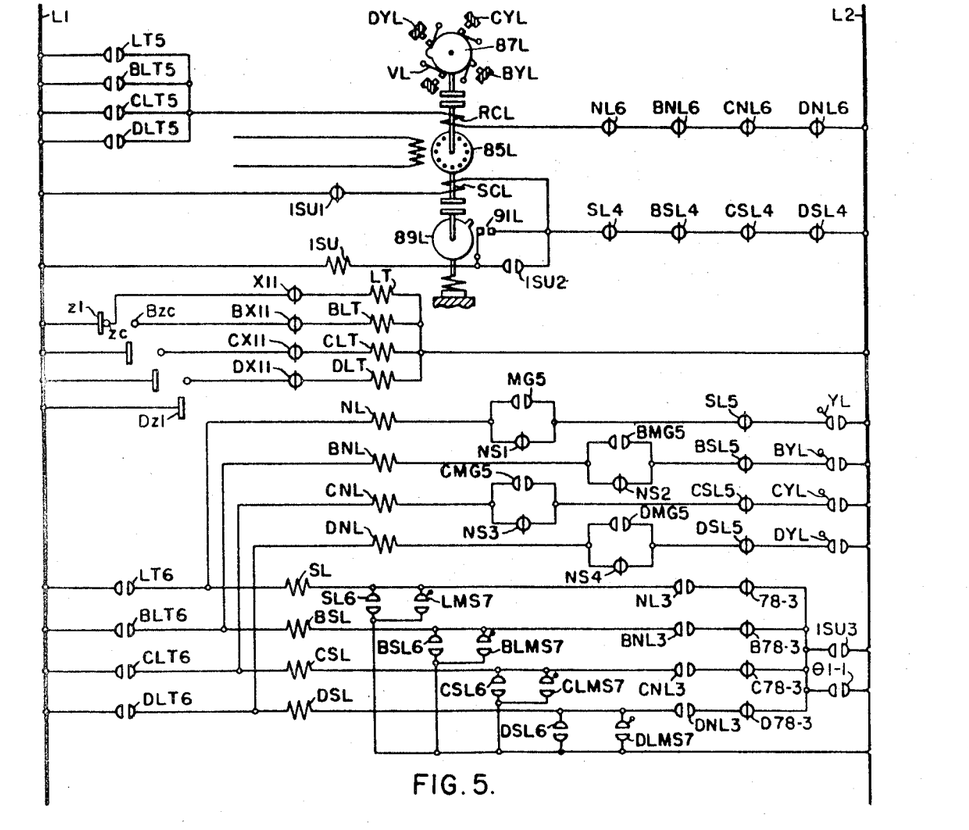

FIGURES 4 AND 5

FIGURE 4 reproduces the dispatching circuits of FIG. 7 of the aforesaid Santini et al. patent with two changes. In the present case, the motor 85T is continually energized from a source represented by the conductors LAC1 and LAC2.

The second change relates to the provision of make contacts $\theta$2–1 of a down dispatcher expedite relay $\theta$2 in shunt with the make contacts 1SD4. As long as the make contacts $\theta$2–1 are open, the dispatcher of FIG. 4 dispatches elevator cars from the sky lobby in the same manner as in the aforesaid patent. However, if a predetermined preponderance of traffic is in the up direction from the main floor the make contacts $\theta$2–1 close to expedite the dispatch of additional cars from the sky lobby towards the main floor.

It will be understood that the upper terminal relays TT, BTT, CTT and DTT are picked up respectively as long as their associated elevator cars A, B, C and D are respectively at the sky lobby floor.

The remaining components shown in FIG. 7 of the aforesaid patent are not here required.

FIGURE 5 reproduces circuits employed for dispatching the elevator cars from the lower terminal or main floor. These circuits are similar to circuits shown in FIG. 8 of the aforesaid patent except for the following change.

The only change consists of the addition of make contacts $\theta$1–1 in shunt with make contacts 1SU3. When a substantial preponderance of traffic is in the down direction towards the main floor the contacts $\theta$1–1 close to expedite dispatch of elevator cars from the main floor towards the sky lobby.

Figure 6:
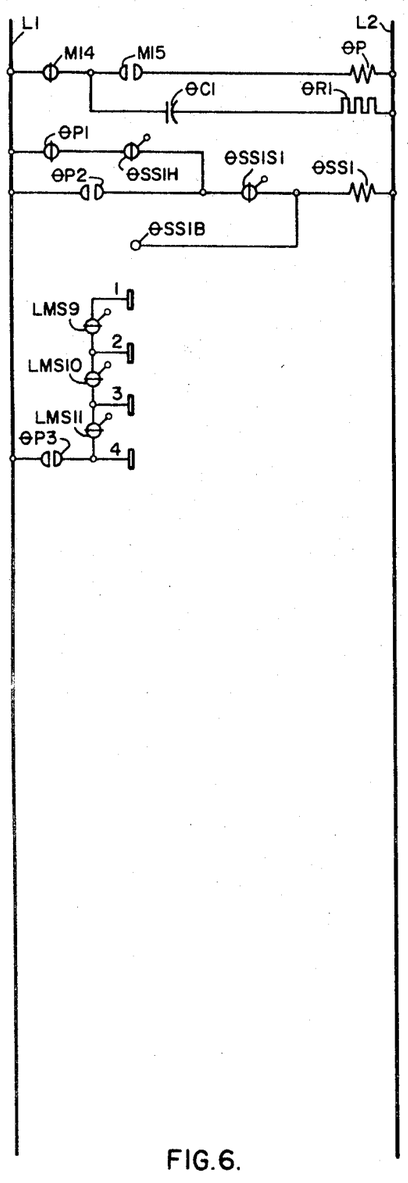

FIGURE 6

FIGURES 6 to 11 introduce a number of new relays. For convenience the following list of new relays is included at this point:

$\theta$1—Up-dispatcher-expedite relay
$\theta$2—Down-dispatcher-expedite relay
$\theta$B4, $\theta$B3, $\theta$BAL, $\theta$TL4—Divisional load relays
$\theta$D2, $\theta$D3—Down-car relay
$\theta$I1, $\theta$I2, $\theta$I3, $\theta$I4—Load-intensity relays
$\theta$P—Period relay
$\theta$MGA—Auxiliary motor-generator relay
$\theta$QMG1—Surplus-car relay
$\theta$QMG2—Deficit-car relay
$\theta$RE—Auxiliary sampling relay
$\theta$SS1—Individual load step relay
$\theta$SS2—Bank load step relay
$\theta$SSB, $\theta$SST—Divisional step relays
$\theta$T—Sampling relay
$\theta$U2, $\theta$U3—Up-cars relay FIG. 6 shows a cycling system for producing a number of pulses corresponding to the loading of the elevator car A in the bank $\theta$ at the start of each trip of the car. A similar cycling system is provided for each elevator car of the bank $\theta$.

When the elevator car A is stopped at either of its terminal floors, a capacitor $\theta$C1 is connected in series with a resistor $\theta$R1 and break contacts M14 of the running relay M across the direct-current buses L1 and L2. The break contacts M14 are added to the running relay M of the aforesaid Santini et al. patent. Consequently, the capacitor is charged to a voltage dependent on the voltage across the buses.

When the elevator car A starts from the terminal floor at which it is stopped the break contacts M14 open to interrupt the charging circuit of the capacitor $\theta$C1. In addition, the make contacts M15 close to connect a period relay $\theta$P across the capacitor $\theta$C1 and the resistor $\theta$R1. The contacts M15 are added to the running relay M of the above-mentioned patent. The period relay P picks up and remains picked up for the time required for the capacitor $\theta$C1 to discharge through the resistor $\theta$R1 and the relay $\theta$P to the dropout voltage of the relay $\theta$P. Consequently, the period relay $\theta$P picks up for a brief period at the start of each trip of the elevator car A.

The elevator car A is equipped with a plurality of switches which indicate different levels of loading of the elevator car. For illustrative purposes, three load switches LMS9, LMS10 and LMS11 are provided and may be operated by the load-measuring switch LMS of the above-mentioned Santini et al. patent. To illustrate suitable parameters, the switch LMS9 may be designed to be biased to closed position and to be opened when the loading of the elevator car reaches 20% of rated load. The switch LMS10 similarly may open when the loading reaches 50% of the rated load and the switch LMS11 may be designed to open when the loading reaches 80% of rated load.

The three load switches LMS9, LMS10 and LMS11 together with make contacts $\theta$P3 of the period relay $\theta$P are connected in series between the bus L1 and a first contact segment located in one level of an individual load step relay $\theta$SS1. The second contact segment of this level is connected between the switches LMS9 and LMS10. The third contact segment of this level is connected between the switches LMS10, and LMS11. The fourth contact segment of this level is connected between the contacts $\theta$P3 and the switch LMS11.

Figure 9:
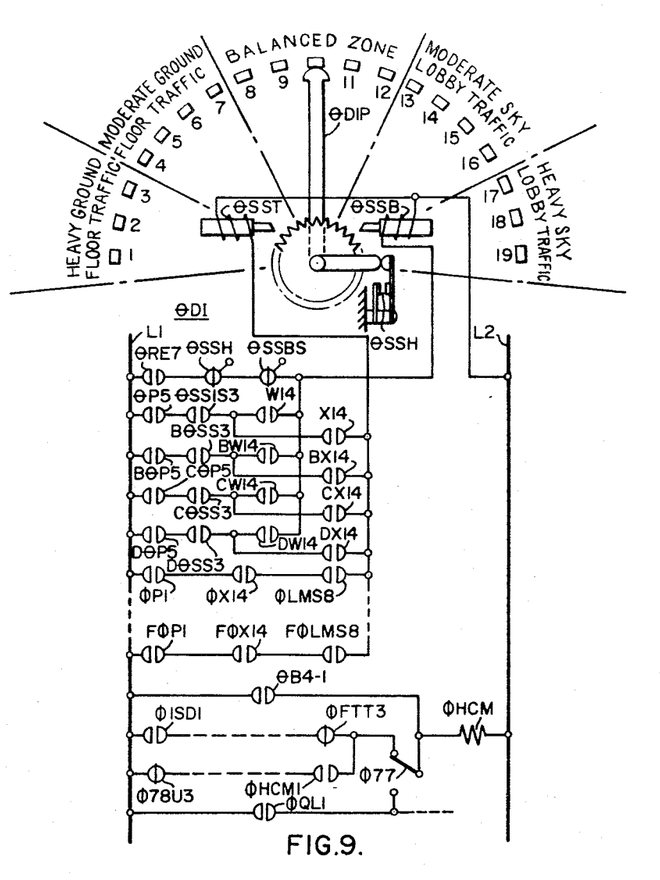

The step switch $\theta$SS1 may be of convention construction and includes a wiper or brush $\theta$SS1B which is stepped successively from a home position into engagement with the contact segments 1, 2, 3 and 4 in the level or row associated with the brush. In addition, the step switch has self-steeping contacts $\theta$SS1S1 and similarly-operated contacts $\theta$SS1S2 (FIG. 7) and $\theta$SS1S3 (FIG. 9). When the step switch is at rest, the self-stepping contacts θSS1S1 are closed. For each step of the step switch, the contacts θSS1S1 to θSS1S3 briefly open and then reclose. Contacts θSS1S1 are connected in series with the operating winding of the step switch θSS1 and the make contacts θP2 of the period relay θP across the buses L1 and L2 to provide a self-stepping circuit for the step switch.

A homing switch θSS1H is provided for the step switch θSS1. This switch is open when the step switch is in its home position as illustrated in FIG. 6. For all other positions of the steps switch, the homing switch θSS1H is closed. The homing switch is connected in series with break contacts θP1 of the period relay θP across the make contacts θP2.

Examples of the operation of the step switch θSS1 now will be given. The circuits of FIG. 6 indicate that the elevator car A is at rest at a terminal floor and that the capacitor θC1 is charged. When the elevator car A is started from the terminal floor the break contacts M14 open to pick up the period relay θP for a time as above explained. When the period relay θP picks up it opens its break contacts θP1 to interrupt the homing circuit of the step switch θSS1. The make contacts θP3 close to connect the contact segments of the step switch to the bus L1.

The make contacts θP2 close to complete a self-stepping circuit for the step switch θSS1. The first step of this switch carries the brush θSS1B into engagement with its first contact segment. During this step the self-stepping contacts θSS1S1 first open and then reclose.

It will be assumed first that the elevator car A is empty. For this condition all of the load switches LMS9 to LMS11 are closed. Consequently, when the brush θSS1B engages the contact segment 1 of the associated level a continuous energizing circuit is established for the step switch which may be traced as follows: L1, θP3, LMS11, LMS10, LMS9, contact segment 1, brush θSS1B, θSS1, L2. This circuit holds the step switch in the first step position.

At the close of its period, the period relay θP drops out. The resultant opening of the make contacts θP2 and θP3 interrupts the energizing circuit for the step switch θSS1. However the closure of the break contacts θP1 completes a homing circuit for the step switch which rapidly returns the step switch to its home position.

Let it be assumed next that the elevator car A is loaded to 20% of its rate of capacity at the time it leaves its terminal floor. The step switch θSS1 steps to its first position in the manner previously described. However, the load switch LMS9 is now open and the step switch cannot be energized therethrough.

The step switch θSS1 now steps to its second position in which the brush θSS1B engages its associated contact segment 2. The operating winding of the step switch now is energized through the contacts θP3 and the switches LMS11 and LMS10 to hold the step switch in its second position. During the second step, the self-stepping contacts θSS1S1 again open and then close. The step switch remains in its second position until the period relay θP drops out. The step switch then returns to its home position in the manner previously described. In this way, the step switch for each trip of the elevator car steps a number of times dependent on the loading of the elevator car.

Figure 7:
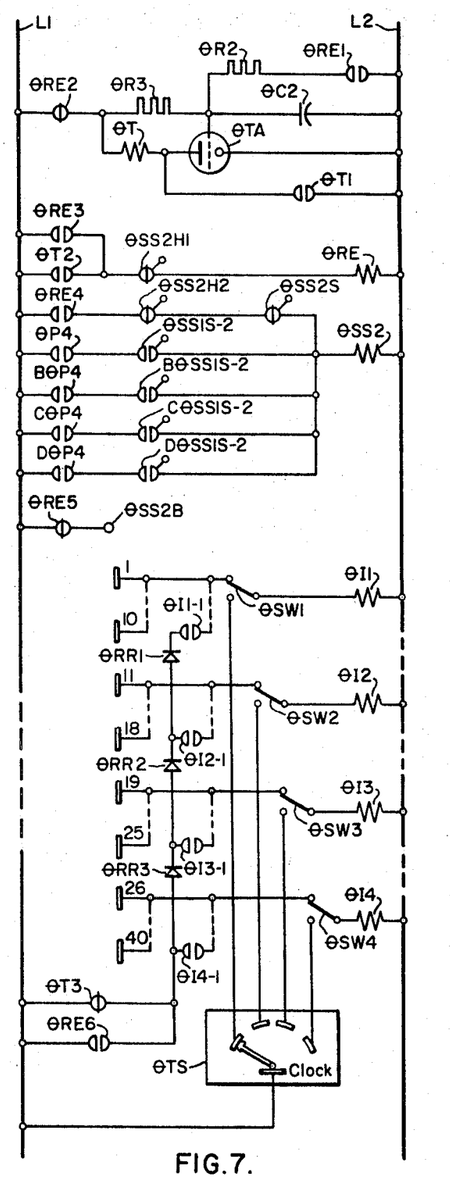

FIGURE 7

The loadings of the elevator cars of the bank θ are summed at regular sampling intervals by a step switch θSS2 which has two sets of homing contacts θSS2H1 and θSS2H2. These contacts are open when the step switch is in its home position and are closed when the step switch is away from its home position. The step switch also has a set of self-stepping contact θSS2S. These contacts are connected in series with the operating winding θSS2 of the step switch, with the homing contacts θSS2H2 and with make contacts θRE4 of an auxiliary sampling relay θRE to establish a self-stepping circuit for the step switch.

The step switch θSS2 in addition has a first level or row wiper or brush θSS2B which is connected to the bus L1 through break contacts θRE5 of the auxiliary sampling relay θRE. The brush coacts with the first lever or row of contact segments which are marked 1 to 40 in FIG. 7. The contact segments are associated with four load-intensity relays θI1 to θI4. Pickup of the relay θI1 indicates a light loading of the bank θ. Pickup of the relays θI2, θI3 and θI4 respectively indicate moderate, heavy and very heavy loading of the bank θ.

Contact segments 1 to 10 of the first level of the step switch θSS2 are connected to the bus L2 through the light-load-intensity relay θI1. Contact segments 11 to 18 are connected to the bus through the operating winding of the moderate-load-intensity relay θI2. Contact segments 19 to 25 are connected to the bus L2 through the operating winding of the heavy-load-intensity relay θI3. Contact segments 26 to 40 are connected to the bus L2 through the operating winding of the very-heavy-load-intensity relay θI4.

When the light-load-intensity relay θI1 picks up it closes make contacts θI1–1 to establish with three rectifiers θRR1 to θRR3 and either break contacts θT3 of a sampling relay θT or break contacts θRE6 of the auxiliary sampling relay θRE a holding circuit. A holding circuit for the relay θI2 is established by make contacts θI2–1, the rectifiers θRR2 and θRR3 and either of the contacts θT3 or θRE6. For the relay θI3 the holding circuit includes the make contacts θI3–1, a rectifier θRR3 and either of the sets of contacts θT3 or θRE6. Finally, the holding circuit for the relay θI4 includes only the make contacts θI4–1 and either of the sets of contacts θT3 or θRE6.

Any suitable timer may be employed for establishing regular sampling periods for measuring load intensity. In the embodiment illustrated in FIG. 7, a thyratron tube θTA, preferably of the cold cathode type, has its plate or anode connected to the bus L1 through the operating winding of the sampling relay θT and break contacts θRE2 of the auxiliary sampling relay θRE. The plate also is connected to the bus L2 through make contacts θT1 of the sampling relay θT. A capacitor θC2 is connected to be charged from the conductors L1 and L2 through a charging resistor θR3 and the break contacts θRE2 of the auxiliary sampling relay θRE. The voltage across the capacitor is applied between the grid and cathode of the thyratron tube θTA. A discharge resistor θR2 is connected across the capacitor θC2 through make contacts θRE1 of the auxiliary sampling relay θRE.

In reviewing the operation of the components shown in FIG. 7, it will be assumed that the auxiliary sampling relay θRE has just dropped out to close its break contacts θRE2 thus connecting the capacitor θC2 and the charging resistor θR3 in series across the direct current buses L1 and L2. The capacitor now starts to charge at a rate determined by the sizes of the capacitor and the charging resistor. At the end of a predetermined time, for example, two minutes, the voltage across the capacitor becomes sufficient to fire the thyratron tube θTA and such firing results in energization and pickup of the sampling relay θT.

When it picks up, the sampling relay closes its holding contacts θT1 to complete with the break contacts θRE2 a holding circuit for the sampling relay. In addition, the break contacts θT3 open to interrupt the holding circuits for the load-intensity relays θI1 to θI4.

If the bank load step relay θSS2 is in its home position, the homing contacts θSS2H1 are open and closure of the make contacts θT2 of the sampling relay θT at this time has no effect on the system. However, if the step relay is away from its home position, the contacts θSS2H1 are closed and closure of the contacts θT2 consequently completes an energizing circuit for the auxiliary sampling relay θRE.

Pickup of the auxiliary sampling relay θRE results in closure of its self-holding contacts θRE3 which complete a holding circuit through the homing contacts θSS2H1.

Consequently, the auxiliary sampling relay remains picked up until the step switch returns to its home position. In addition, the break contacts θRE2 open to drop out the sampling relay θT, and make contacts θRE1 close to establish a discharge circuit for the capacitor θC2 through the discharge resistor θR2. Closure of the make contacts θRE4 completes a self-stepping circuit for the step relay θSS2 through the homing contacts θSS2H2 and the self-stepping contacts θSS2S. Consequently the step relay now steps to its home position where the contacts θSS2H2 open to interrupt the homing circuit. Opening of the break contacts θRE5 disconnects the brush θSS2B of the step relay from the associated bus L1 to prevent energization therethrough of the load-intensity relays while the step switch is resetting.

Let it be assumed that immediately before the relay θT picks up the brush θSS2B was engaged with the contact segment 19, that all four load-intensity relays θI1 to θI4 had been energized during the preceding sampling period and that they were being held in by the break contacts θT3. When the relay θT picks up, the break contacts θT3 open to interrupt the holding circuits for the load-intensity relays. This results in deenergization and drop out of the load intensity relay θI4. However, the load-intensity relays θI1 and θI3 continue to be held in picked-up condition through the break contacts θRE5.

Pickup of the sampling relay θT is followed after a slight time delay by pickup of its auxiliary sampling relay θRE. The make contacts θRE6 are arranged to close slightly before the break contacts θRE5 open. Consequently the holding circuit reestablished by closure of the contacts θRE6 now maintains picked up the three load-intensity relays θI1 to θI3. Thus, the load represented by the pickup of these three load-intensity relays is stored for the duration of the next sampling period which is terminated by the next pickup of the sampling relay θT.

It will be recalled that pickup of the auxiliary sampling relay θRE is followed by drop out of the sampling relay θT. In dropping out, the sampling relay opens its holding contacts θT1 to prepare for a subsequent timing operation. In addition, the break contacts θT3 close to maintain the holding circuit for any of the load-intensity relays which may be picked up at this time. The make contacts θT2 reopen but the closed make contacts θRE3 maintain a holding circuit for the auxiliary sampling relay θRE until the step relay θSS2 reaches its home position to open the homing contacts θSS2H1.

During the time required for the capacitor θC2 to recharge to a voltage sufficient to again fire the thyratron tube θTA each car of the feeder bank θ leaving a terminal floor with substantial load supplies pulses to the step relay θSS2. Thus when the elevator car A leaves a terminal floor, the make contacts θP4 of the period θP close for a time sufficient to measure the load in the elevator car. It will be recalled that during this time the contacts θSS1S2 of the step switch θSS1 close and reopen a number of times dependent on the load carried by the elevator car during this period, and each closure produces a pulse which advances the step switch θSS2 through one step. Inasmuch as similar pulse circuits are provided for each of the elevators of the bank θ it follows that the step switch θSS2 is advanced through a number of steps in each of its sampling periods which corresponds to the total load carried by the bank θ during such period.

It is possible that two or more cars of the bank θ may apply pulses to the step relay θSS2 at the same time. The probability of the occurrence of such coincident pulses is small and may be neglected for practical purposes. However, if desired, conventional anticoincident circuits may be employed for assuring the application of one pulse to the step relay θSS2 for each operation of the contacts θSS1S2 to DθSS1S2.

If the traffic follows a reasonably regular pattern each day or each week the load-intensity relays θI1 to θI4 may be operated by a time switch or clock θTS. To illustrate such operation, the four switches θSW1 to θSW4 may be operated to their lower positions as viewed in FIG. 7. This connects the load-intensity relays to contacts of the time switch βTS for the purpose of energizing at each instant the load-intensity relays corresponding to the expected load for such instant.

Figure 8:
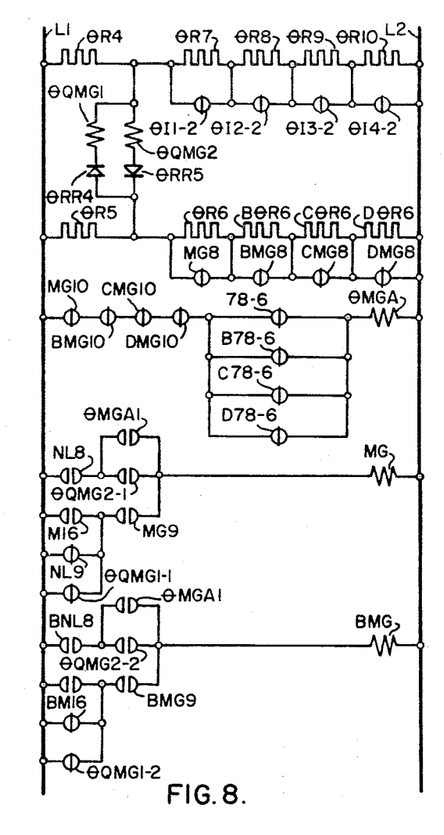

FIGURE 8

In FIG. 8 circuits are shown for controlling the number of elevators in the feeder bank θ which are in service. If the bank has more elevators in service than are required a surplus-car relay θQMG1 picks up to decrease the number of elevator cars in service. If the number of elevators in service is insufficient a deficit-car relay θQDG2 picks up to increase the number of elevators in service.

The relays θQMG1 and θQMG2 are controlled by a bridge circuit which includes five resistors θR4 and θR7 to θR10 connected in series across the direct current buses L1 and L2. Five additional resistors θR5, θR6, BθR6, CθR6 and DθR6 are connected in series across the buses L1 and L2. Each of the relays θQMG1 and θQMG2 is connected in series with a separate rectifier θRR4 or θRR5 between a point located intermediate the resistors θR4 and θR7 and a point intermediate the resistors θR5 and θR6. The resistors θR4 and θR5 represent two arms of the bridge. A third arm contains the resistors θR7 to θR10 in series. The remaining arm of the bridge contains the resistors θR6 to DθR6 in series. The resistors θR4 and θR5 may have equal resistance values. The remaining resistors each may have a resistance value equal to one fourth the reistance value of the resistor θR4.

The rectifiers θR4 and θR5 are oppositely directed. As long as the bridge is balanced both of the relays θQMG1 and θQMG2 are dropped out and no change is made in the number of elevators in service. The resistors θR7 to θR10 are shunted respectively by break contacts θI1–2 to θI4–2 of the load-intensity relays. The resistors θR6 to DθR6 are shunted respectively by break contacts MG8 to DMG8 of the motor-generator starting switches for the four elevator cars.

Break contacts MG10 to DMG10 of the four motor-generator starting switches are connected in series with an auxiliary motor-generator relay θMGA across the buses L1, L2 through a parallel circuit having four arms containing respectively break contacts 78–6 to D78–6 of the no-call relays 78 to D78.

The operating winding of the motor-generator starting switch MG is connected across the buses L1 and L2 through make contacts NL8 of the lower-terminal next relay and make contacts θQMG2–1 of the deficit-car relay θQMG2. When the motor-generator starting switch picks up it closes its make contacts MG9 to establish a holding circuit which is completed through any one of three sets of contacts; namely, make contacts M16 of the running relay M, break contacts NL9 of the lower-terminal next relay and break contacts θQMG1–1 of the surplus-car relay. Similar circuits are shown for the motor-generator starting relay BMG for the elevator B and similar circuits (not shown) are provided for each of the remaining motor-generator starting relays.

If a call is registered (at least one set of contacts 78–6 to D78–6 is closed) while no motor-generator set is running (contacts MG10 to DMG10 are closed) the auxiliary motor-generator relay θMGA picks up to shunt the contacts θQMG2–1 to θQMG2–4 thus permitting starting of a "next" car to answer the call. Registration of a call is indicated by energization of one of the floor or car call registering relays of FIG. 3, and by the resultant drop out of one of the no-call relays 78 to D78 in the manner discussed in the above-mentioned patent.

Let it be assumed that the load is very heavy and that all of the load-intensity relays θI1 to θI4 are picked up. Let it be assumed further that all of the elevators of the feeder bank θ are in operation and that the motor-generator starting switches for these elevators consequently are all picked up. Under these circumstances, all of the resistors in the bridge are effectively in circuit and the bridge is balanced. Therefore, the surplus-car relay θQMG1 and the deficit-car relay θQMG2 are both dropped out.

Let it be assumed next that the load-intensity drops to a value such that the load-intensity relay θI4 drops out to close its break contacts θI4–2 and that the remaining load-intensity relays remain picked up. Under these circumstances the resistor θR10 is effectively removed from the bridge circuit. The bridge now is unbalanced in a direction such that the surplus-car relay θQMG1 picks up to open the break contacts θQMG1–1 in the circuits of the motor-generator starting switch MG of the elevator A and similar contacts located in the circuits for the motor-generator starting switches of the other elevators.

After the pickup of the relay θQMG1 it will be assumed that the elevator car A is selected as the next car to leave the main floor. Under such circumstances, the make contacts M16 of the running relay M are open for the reason that the car has not yet started. The break contacts of the lower-terminal next relay NL9 are open. The make contacts θQMG2–1 of the deficit-car relay and the contacts θMGA1 of the auxiliary motor-generator relay are open. This interrupts the energization of the motor-generator starting switch MG and this switch drops out to remove the elevator car A from service.

In dropping out, the motor-generator starting switch MG closes its break contacts MG8 to effectively remove the resistor θR6 from the bridge circuit. The bridge now is restored to balance and the surplus-car relay θQMG1 drops out to reclose its break contacts θQMG1–1 and similar contacts for the other cars of the bank. Therefore, no other elevator in the bank will be removed from service as long as the bridge remains in balance.

Let it be assumed now that the load-intensity increases until the load-intensity relay θI4–2 again picks up to re-open its break contacts θI4–2. This effectively restores the resistor θR10 to the bridge. Inasmuch as the motor-generator starting switch MG remains dropped out, the break contacts MG8 are still closed and the resistor θR6 effectively is out of the bridge. For these reasons the bridge is unbalanced in the opposite direction and the deficit-car relay θQMG2 picks up to close its make contacts θQMG2–1 and similar contacts in the circuits of the motor-generator starting switches for the other elevators of the bank. When the elevator car A is again selected as the next elevator car to leave the main floor the make contacts NL8 of the lower-terminal next relay NL close to complete an energizing circuit for the motor-generator starting switch MG. This restores the elevator A to service. When it picks up, the motor-generator starting switch MG opens its break contacts MG8 to place the resistor θR6 effectively in the bridge. This rebalances the bridge and causes the deficit-car relay θQMG2 to drop out. This relay thereupon opens its make contacts θQMG2–1 and similar contacts associated with the motor-generator starting switches of the remaining cars of the bank.

As shown in the aforesaid Santini et al. patent, the dispatcher for the lower-terminal floor is so arranged that an elevator car at the lower-terminal floor having its motor-generator set in operation is selected as a next car in preference to an elevator car which has its motor-generator set shut down. This means that if the elevator A is shut down at the lower-terminal floor another elevator will have its car selected as the next car to leave the lower-terminal floor unless no other elevator car with its motor-generator set in operation is located at the main floor.

FIGURE 9

The divisional index θDI is shown in greater detail in FIG. 9. It comprises a two-way step switch having a first operating winding θSST and a second operating winding θSSB. Each pulse applied to the winding θSST notches the pointer θDIP in a clockwise direction for one step. Each pulse applied to the winding θSSB notches the pointer θDIP one step in a counterclockwise direction. Homing contacts θSSH are operated to open condition only when the pointer θDIP occupies its center position as indicated in FIG. 9. At its end, the pointer θDIP has a wiper or brush which coacts with a level or row of contact segments bearing the numbers 1 to 19.

The winding θSSB is connected across the buses L1 and L2 through any one of four similar parallel circuits one for each of the elevators of the feeder bank θ. Thus, for the elevator A, the winding θSSB is connected across the buses through make contacts W14 of the up-direction relay W, contacts θSS1S3 of the individual-load step relay θSS1 and make contacts θP5 of the period relay θP. Similar circuits are shown for the remaining cars of the bank. Thus during a sampling period, the winding θSSB receives a number of pulses which corresponds to the loadings of the elevator cars during up trips.

In a similar manner, the winding θSST receives a number of pulses corresponding to the loadings of the cars during down trips. For example, for the elevator car A, the winding θSST is connected across the direct-current buses L1 and L2 through make contacts X14 of the down-direction relay X, contacts θSS1S3 associated with the individual-load step relay θSS1 and make contacts θP5 of the period relay P. A similar circuit is shown for each of the elevators of the feeder bank θ.

The sampling period for the divisional index θDI is determined by the auxiliary sampling relay θRE. This relay has make contacts θRE7 which connect the winding θSSB across the buses L1 and L2 through the homing contacts θSSH and the self-stepping contacts θSSBS. Consequently at the end of each sampling period the contacts θRE7 close to step the divisional index θDI to its home position.

Engagement of the pointer θDIP with any of the contact segments 1, 2 and 3 indicates a heavy preponderant movement of traffic up from the main floor. Engagement of the pointer with any of the contact segments 4 to 7 indicates a moderate preponderant movement of traffic from the main floor in an up direction. Engagement of the pointer with any of the contact segments 8 to 12 indicates that traffic components leaving the sky lobby and the main floor are substantially equal or balanced. Engagement of the pointer with any of the contact segments 13 to 16 indicates a moderate preponderant flow of traffic down from the sky lobby. Engagement of the pointer with any of the contact segments 17 to 19 indicates a relatively heavy preponderant movement of traffic from the sky lobby. Other zone arrangements may be employed if desired.

In many applications, it is desirable to bias the divisional index DI in accordance with load moved by the local banks towards the sky lobby. Thus each loaded car in the local bank travelling down towards the sky lobby may be arranged to supply a predetermined number of pulses to the winding θSST. In FIG. 9, the winding θSST is additionally connected across the buses L1 and L2 through any one of a number of parallel circuits one for each of the local cars. For the car A in the bank φ the winding θSST is connected across the buses through the contacts φP1 of a period relay φP make contacts φX14 of a down direction relay φX and contacts φLMS8 of a load switch in series. The contacts φP1 close for a short time when the elevator car A of the bank φ starts down. The contact φX14 are closed while the elevator car A of the bank φ is set for down travel. The contacts φLMS8 are closed while the elevator car A of the bank φ is loaded to a predetermined extent such as 80% of rated capacity. If the elevator car A of the bank φ while loaded starts down, a pulse will be delivered to the winding θSST to actuate the divisional index θDI.

As pointed out below the contacts θB4–1 of FIG. 9 close for a heavy preponderant movement of traffic from the main floor towards the sky lobby. On closure of these contacts, one or more of the local banks may expedite the movement of elevator cars to the sky lobby. In FIG. 9, closure of the contacts θB4–1 connects the high call reversal relay φHCM for the bank φ across the buses L1 and L2. The relay φHCM corresponds to the relay HCM of the aforesaid Santini et al. patent and operates in the same way to expedite movement of the associated elevator cars to the sky lobby. Contacts of the relay θB4 similarly may control a relay corresponding to the relay HCM for each of the other local banks. A number of controlling components in circuits of the relay φHCM as shown in the present FIG. 9 and are identified by the same reference characters employed for similar components for the relay HCM in said patent, but preceded by the prefix φ.

Figure 10:
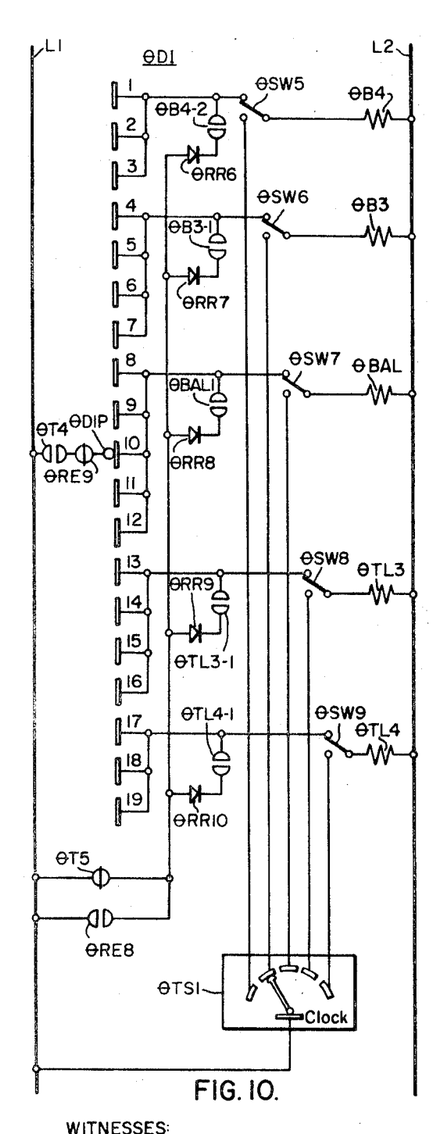

FIGURE 10

In FIG. 10, divisional load relays θB4, θB3, θBAL, θTL3 and θTL4 are responsive to the relation between traffic moving up from the main floor and traffic moving down from the sky lobby. The pointer θDIP is connected to the positive bus L1 through make contacts θT4 of the sampling relay θT and break contacts θRE9 of the relay θRE. Pickup of the relay θB4 indicates a heavy preponderance of traffic away from the main floor towards the sky lobby. This relay is connected between the negative bus L2 and the three contact segments 1, 2 and 3 of the divisional index θDI when the switch θSW5 is in its upper position.

The relay θB3 picks up to indicate a moderate preponderance of traffic away from the main floor towards the sky lobby and is connected between the bus L2 and the contact segments 4 to 7 when the switch θSW6 is in its upper position.

The relay θBAL when picked up indicates a substantially balanced traffic condition. It is connected between the bus L2 and the contact segments 8 to 12, when the switch θSW7 is in its upper position.

When picked up, the relay θTL3 indicates a moderate preponderance of traffic from the sky lobby towards the main floor. It is connected between the bus L2 and the contact segments 13 to 16 when the switch θSW8 is in its upper position.

Pickup of the relay θTL4 indicates a heavy preponderance of traffic from the sky lobby towards the main floor. This relay is connected between the bus L2 and the contact segments 17, 18 and 19 when the switch θSW8 is in its upper position.

A holding circuit for the relay θB4 is established through either break contacts θT5 of the sampling relay θT or make contacts θRE8 of the auxiliary sampling relay θRE, a rectifier θRR6 and make contacts θB4–2. A holding circuit for the relay θB3 extends through either the contacts θT5 or the contacts θRE8, a rectifier θRR7 and make contacts θB3–1. For the relay θBAL a holding circuit extends through either the contacts θT5 or the contacts θRE8, a rectifier θRR8 and make contacts θBAL1. A holding circuit for the relay θTL3 extends through the contacts θT5 or the contacts θRE8, a rectifier θRR9 and make contacts θTL3–1. For the relay θTL4, a holding circuit extends through either the contacts θT5 or the contacts θRE8, a rectifier θRR10 and contacts θTL4–1.

To illustrate the operation of this circuit, let it be assumed that at the beginning of the sampling period the relay θBAL is energized through the holding circuit: L1, θT5, θRR8, θBAL1, θSW7, θBAL, L2. Let it be assumed further that during the sampling period the pointer θDIP moves into engagement with the contact segment 6. At the end of the sampling period, the break contacts θT5 open to deenergize the relay θBAL. In addition, the make contacts θT4 close to complete an energizing circuit for the relay θB3. The relay θB3 then closes its make contacts θB3–1 to prepare the holding circuit of this relay for subsequent completion. Shortly afterwards, the auxiliary sampling relay θRE picks up to close its make contacts θRE8 and thus completes a holding circuit for the relay θB3. Also break contacts θRE9 open to prevent false pick up of a divisional load relay during reset of the two-way step switch. (These contacts could be omitted if the sequence is such that the relay θT always drops out before the two-way step switch starts to move at the start of a resetting operation). The relay θT then drops out to close its break contacts θT5 for the purpose of maintaining the holding circuit when the contacts θRE8 subsequently open. In addition, the make contacts θT4 open to disconnect the pointer θDIP from the bus L1.

If the traffic flow follows a regular pattern from day to day or from week to week the relays of FIG. 10 may be operated from a time switch or clock θTS1. Switches θSW5 to θSW9 are provided for the purpose of switching the relays to the time switch. When so switched, the time switch picks up the proper relay for the proper period of time.

Figure 11:
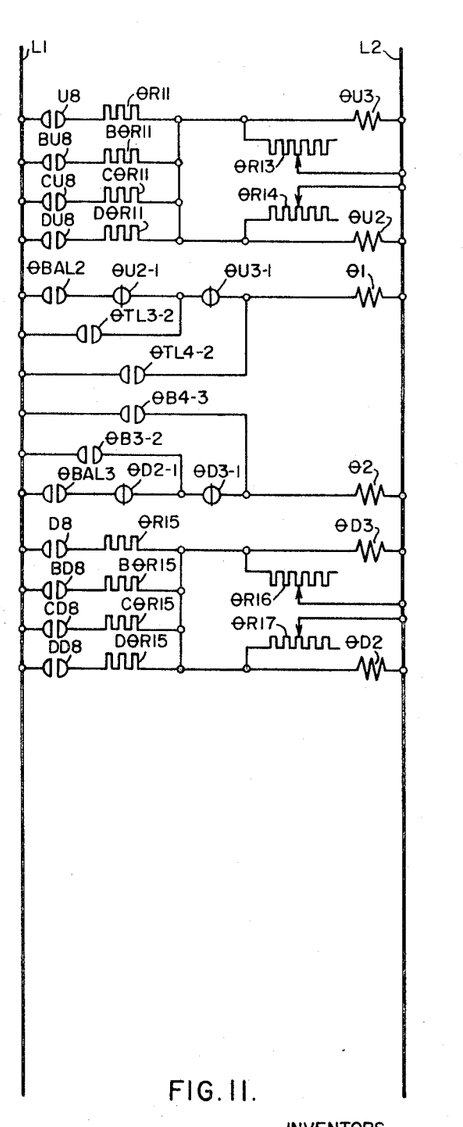

FIGURE 11

In FIG. 11, two up-car relays θU2 and θU3 are responsive to the number of elevators in the feeder bank θ which are set for up travel. These relays are connected in parallel for energization through one or more of four parallel circuits, one for each of the elevators. Thus for the elevator A one of the circuits contains in series make contacts U8 of the up switch U and a resistor θR11. It will be understood that the make contacts U8 are operated by the up switch U of the aforesaid Santini et al. patent. The resistors θR11 to DθR11 for the four elevators have equal resistance values.

The pickup point of the up-car relay θU2 is adjusted by means of an adjustable resistor θR14 which is connected across the operating winding of the relay. For present purposes it will be assumed that the relay is adjusted to pick up when energized through two or more of the resistors θR11 to DθR11. It is dropped out when energized through only one of these resistors.

In a similar manner, an adjustable resistor θR13 is connected across the operating winding of the up-car relay θU3 for the purpose of adjusting the pickup point of this relay. For present purposes, it will be assumed that this relay picks up when energized through three or more of the resistors θR11 to DθR11. It is dropped out when energized through only two of these resistors.

Various procedures are available for dispatching elevator cars from the terminal floors. For example, an elevator car selected as the next car to leave a terminal floor may be dispatched a predetermined time after the preceding car was dispatched, or in dependence on positions of other cars, or under certain load conditions, or in response to assignment to answer a specific call registration, or after selection. The relays θ1 and θ2 are intended to allocate a proportion of cars in each direction of travel, depending on where the traffic originates.

The relay θ1 may be so arranged that when picked up it permits or expedites the dispatch of elevator cars from the main floor and when dropped out it prevents the dispatch of cars from the main floor or delays such dispatch.

In the illustrated embodiment of the invention, the relay θ1 has make contacts θ1–1 connected across the make contacts 1SU3 (FIG. 5). Let it be assumed that traffic is in the balanced range wherein the divisional load relay θBAL is picked up. Let it be assumed further that the only one elevator car is travelling up. The relay θ1 now is picked up and closes its make contacts θ1–1 (FIG. 5). This cuts out the dispatching interval at the main floor and the next car at the main floor is started up provided that its non-interference relay is dropped out to close its break contacts 70T4 (FIG. 3A). As shown in the aforesaid Santini et al. patent, this relay 70T drops out after a short time delay such as 5 seconds measured from the stopping of the associated elevator car at the main floor.

Assuming that the elevator car B has been running up and that the car A has just been started up, make contacts U8 and BU8 (FIG. 11) are closed and the up-cars relay θU2 picks up. This relay opens its break contacts θU2–1 to deenergize the up dispatcher expedite relay θ1 which opens its make contacts θ1–1 (FIG. 5) to restore the effectiveness of the contacts 1SU3 of the lower-interval holding relay 1SU. Consequently another elevator car cannot be started from the main floor until the dispatching interval has expired.

Let it be assumed next that traffic conditions are such that the preponderance of traffic travelling from the sky lobby to the main floor is moderately heavy and that the relay θTL3 consequently is picked up to close its contacts θTL3–2. If we again assume that only one of the elevators cars is traveling up break contacts θU3–1 of the up-cars relay θU3 is dropped out and the up dispatcher expedite relay θ1 is picked up through the contacts θTL3–2 and θU3–1. This closes the contacts θ1–1 (FIG. 5) to expedite the dispatch of elevator cars from the main floor. If a second car starts from the main floor, while the first car is still running up, the up-cars relay θU2 picks up to open its break contacts θU2–1. This has no immediate effect on the operation of the system. However, if a third car is started from the main floor while the first and second cars are traveling up, the up-cars relay θU3 picks up to open its break contacts θU3–1. This drops out the up dispatcher expedite relay θ1 which opens its make contacts θ1–1 (FIG. 5) to require a subsequent elevator car at the main floor to wait for its dispatching interval before it can be started up.

Let it be assumed next that the preponderance of traffic from the sky lobby to the main floor is very heavy and that the divisional load relay θTL4 consequently is picked up. This relay closes its make contacts θTL4–2 to energize the up dispatcher expedite relay θ1 which closes its make contacts θ1–1 (FIG. 5). Elevator cars are now expedited away from the main floor towards the sky lobby where they are needed until the divisional index operates to deenergize the divisional load relay θTL4 to indicate that the heavy down traffic condition has subsided.

Similar circuits are provided for controlling the dispatch of elevator cars from the sky lobby towards the main floor. Thus, down-cars relays θD2 and θD3 are connected in parallel for energization through one or more parallel circuits one for each of the elevator cars. For the elevator car A one of the parallel circuits includes make contacts D8 of the down switch D and a resistor θR15. Adjustable resistors θR16 and θR17 are connected respectively across the operating windings of the relays θD3 and θD2 for the purpose of adjusting the pickup points of these relays. For illustrative purposes, it is assumed that the relay θD2 is adjusted to pick up when energized through two of the resistors θR15 to DθR15 and to drop out when energized through only one of these resistors. The relay θD3 is arranged to pick up when energized through three of these resistors and to be dropped out when energized through only two of the resistors.

When the divisional load relay θBAL is picked up, its make contacts θBAL3 close to energize the down dispatcher expedite relay θ2 through the break contacts θD2–1 and θD3–1. This expedites dispatch of elevator cars down from the sky lobby in an effort to make two cars run down in the same manner by which closure of the make contacts θBAL2 picked up the up dispatcher expedite relay θ1 to expedite dispatch of elevator cars from the main floor until two cars were running up as outlined above.

If the divisional index registers a moderate preponderant flow of traffic from the main floor towards the sky lobby, the divisional load relay θB3 picks up to close its make contacts θB3–2. This energizes the down dispatcher expedite relay θ2 through the contacts θB3–2 and through the break contacts θD3–1 of the down cars relay θD3. The relay θ2 now expedites the dispatch of elevator cars from the sky lobby towards the main floor where they are needed until three cars set for down travel pick up the down cars relay θD3 to open the break contacts θD3–1. This operation is similar to that resulting from closure of the make contacts θTL3–2 which is discussed above for the opposite traffic flow.

In the presence of a heavy flow of traffic from the main floor towards the sky lobby the make contacts θB4–3 close to pick up the down dispatcher expedite relay θ2. This expedites the dispatch of elevator cars from the sky lobby floor towards the main floor until the down traffic flow decreases sufficiently to result in opening of the make contacts θB4–3.

SUMMARY

In summary, the bridge circuit of FIG. 8 compares the number of cars in service in the feeder bank θ with the intensity of traffic for the purpose of controlling the surplus-car relay θQMG1 and the deficit-car relay θQMG2. If more cars are in service than are required to handle the traffic, the relay θQMG1 operates to shut down the motor-generator sets of the surplus elevator cars. Such cars of course are then available to help out an adjacent feeder bank if required.

If the number of cars in service is insufficient to handle the existing traffic, the relay θQMG2 picks up for the purpose of starting motor-generator sets.

The divisional index compares traffic from the sky lobby to the main floor with traffic from the main floor to the sky lobby. The direction and magnitude of the difference is indicated. If desired, traffic travelling towards the sky lobby in the local banks may modify the registration of the divisional index. The divisional index is employed for controlling the allocation of cars in the feeder bank to the sky lobby and to the main floor in order to handle traffic most efficiently. If desired, the divisional index may be utilized to expedite return of elevator cars in the local banks to the sky lobby under certain traffic conditions.

If the flow of traffic follows a repetitive pattern on a daily or weekly basis, the number of elevator cars in service, the allocation of cars to the sky lobby and the main terminal and the expediting of cars towards the sky lobby may be controlled by time clocks or time switches.

We claim as our invention:

1. A conveyor arrangement for a structure having a plurality of landings including a first landing, a third landing displaced from the first landing, and a second landing intermediate the first and third landings, said conveyor arrangement having a first conveyor system including a vehicle mounted for movement between the first and second landings as terminals for transporting load between the first and second landings and a second conveyor system including a vehicle mounted for movement between the second and third landings for serving said second and third landings, in combination with operating means for moving said vehicles relative to the structure to serve said landings, and control means operable between a first condition and a second condition, said control means in the first condition coacting with the operating means to provide a first conveyor service for said landings, and said control means in the second condition coacting with the operating means to provide a second conveyor service for said landings wherein movement of the vehicle in one of said conveyor systems is expedited in a predetermined direction, in combination with expediting means responsive to a traffic condition in one of the conveyor systems for modifying said control means to alter operation of the other of the conveyor systems.

2. An arrangement as claimed in claim 1 wherein said control means in its second condition is effective in the presence of a preponderant direction of traffic flow for expediting movement of the vehicle in each of said conveyor systems between said second landings and a landing spaced from the second landing in a direction opposite to the preponderant direction of traffic flow.

3. A conveyor arrangement for a structure having a plurality of landings including a first landing, a third landing displaced from the first landing, and a second landing intermediate the first and third landings, said conveyor arrangement having a first conveyor system including a vehicle mounted for movement between the first and second landings as terminals for transporting load between the first and second landings and a second conveyor system including a vehicle mounted for movement between the second and third landings for serving said second and third landings, in combination with operating means for moving said vehicles relative to the structure to serve said landings, and control means operable between a first condition and a second condition, said control means in the first condition coacting with the operating means to provide a first conveyor service for said landings, and said control means in the second condition coacting with the operating means to provide a second conveyor service for said landings wherein movement of the vehicle in one of said conveyor systems is expedited in a predetermined direction, wherein said control means in the second condition expedites movement of the vehicle in the first conveyor system towards the second landing, and wherein said control means is operable to a condition for coacting with the operating means to expedite movement of the vehicle in the second conveyor system towards the second landing.

4. An arrangement as claimed in claim 1 wherein the expediting means includes with first expediting means responsive to a preponderance of traffic flow from said first landing towards said second landing for coacting with the control means to expedite movement of the vehicle in said second conveyor system towards the second landing, and second expediting means responsive to a substantial flow of traffic in said second conveyor system towards the second landing for coacting with the control means to expedite movement of the vehicle in said first conveyor system towards the second landing.

5. A conveyor arrangement as claimed in claim 1 in combination with timing means for transferring the control means from one to the other of said conditions at a predetermined time.

6. A conveyor arrangement as claimed in claim 3 in combination with timing means for transferring the control means from the first condition to the remainder of the conditions and back to the first condition at predetermined times.

7. A conveyor arrangement as claimed in claim 1 wherein said first conveyor system comprises a plurality of vehicles each independently movable between the first and second landings, said operating means comprises means comprises means for moving each of the vehicles in said first conveyor system between the first and second landings and dispatching means for dispatching each of said last-named vehicles from each of said first and second landings a substantial time after departure from the associated landing of a preceding vehicle, and said control means comprises means effective for said second condition when a preponderance of traffic desires transportation from one towards the other of the first and second landings for expediting dispatch of vehicles in the first conveyor system from such other of the first and second landings.

8. A conveyor arrangement as claimed in claim 1, wherein the first conveyor system includes a plurality of vehicles, and wherein said control means in the second condition allocates to each of the first and second landings a number of the vehicles in the first conveyor system dependent on the proportion of traffic handled by the first conveyor system from the associated landing.

9. A conveyor arrangement as claimed in claim 1, wherein said second and third landings are vertically spaced successively above the first landing, and wherein a plurality of additional landings are vertically spaced between the second and third landings, said first conveyor system comprising a plurality of first elevator cars each independently movable between the first and second landings, said operating means comprising means for moving each of the first elevator cars between the first and second landings, said second conveyor system comprising a plurality of second elevator cars each independently movable between the second landing and a plurality of landings located above the second landing, said operating means comprising means for moving each of the second elevator cars to serve the second landing and a plurality of landings above the second landing, said control means being responsive to a substantial demand for service in one of said conveyor systems towards the second landing for expediting movement of elevator cars in the other of said conveyor systems towards the second landing.

10. A conveyor system as claimed in claim 9 wherein said control means is responsive to traffic flow in the last-named conveyor system away from the second landing for expediting movement of elevator cars in the last-named conveyor system towards the second landing.

11. A conveyor system as claimed in claim 10 in combination with pulsing means for each elevator car in one of said conveyor systems for generating a number of pulses of a quantity dependent on the loading of the associated elevator car, means for counting the total number of said pulses, and means responsive to said total number for controlling the number of elevator cars in the last-named conveyor system in service.

12. A conveyor arrangement as claimed in claim 1, wherein said second and third landings are vertically spaced successively above the first landing, and wherein a plurality of additional landings are vertically spaced between the second and third landings, said first conveyor system comprising a plurality of first elevator cars each independently movable between the first and second landings, said operating means comprising means for moving each of the first elevator cars between the first and second landings, said second conveyor system comprising a plurality of second elevator cars each independently movable between the second landing and a plurality of landings located above the second landing, said operating means comprising means for moving each of the second elevator cars to serve the second landing and a plurality of landings above the second landing, said expediting means comprising first traffic means responsive to a substantial flow of traffic in the first conveyor system towards the second landing for coacting with the control means to expedite movement of the second elevator cars towards the second landing and to expedite movement of the first elevator cars towards the first landing, and second traffic means responsive to a substantial flow of traffic in the second conveyor system towards the second landing for coacting with the control means to expedite movement of the first elevator cars towards the second landing, a comparison means for comparing the number of the elevator cars in operation with the demand for elevator service in the first conveyor system, and means responsive to the comparison means for varying the number of the first elevator cars in operation in accordance with the demand for elevator service.

13. A conveyor arrangement as claimed in claim 12, wherein said comparison means comprises pulse means for generating a number of pulses of a quantity dependent on car loading for each of the first elevator cars on each trip, and summing means for repetitively summing said pulses to indicate the service demand for the first conveyor system, and means responsive to the difference between the service demand indication of said summing means and the number of the first elevator cars in operation.

14. A conveyor arrangement as claimed in claim 13, wherein said first traffic means comprises a divisional index having an index member operable in first and second opposing senses, means for operating the index members in the first sense for each movement of load from the first landing by one of the first vehicles, means for operating the index member in the second sense for each movement of load from the second landing by one of the first vehicles, and means responsive to the condition of the index member for dividing between the first and second landings allocations of the first elevator cars in accordance with the division in traffic requirements from one to the other of the first and second landings.

15. A conveyor arrangement as claimed in claim 14, wherein the second traffic means comprises means responsive to predetermined traffic flow in the second conveyor system towards the second landing for operating the index member in the second sense.

References Cited

UNITED STATES PATENTS

| | | | |
|---|---|---|---|
| 1,967,832 | 7/1934 | Lindquist. | |
| 2,688,383 | 9/1954 | Eames | 187—29 |
| 2,886,137 | 5/1959 | Lund et al. | 187—29 |
| 2,997,134 | 8/1961 | Santini et al. | 187—29 |
| 3,126,982 | 3/1964 | Burgy | 187—29 |
| 3,323,606 | 6/1967 | Bruns et al. | 187—29 |

ORIS L. RADER, Primary Examiner

W. E. DUNCANSON, JR., Assistant Examiner